Oct. 8, 1940. M. IMERSHEIN Re. 21,595
UNDERGARMENT
Original Filed April 28, 1937 3 Sheets-Sheet 1
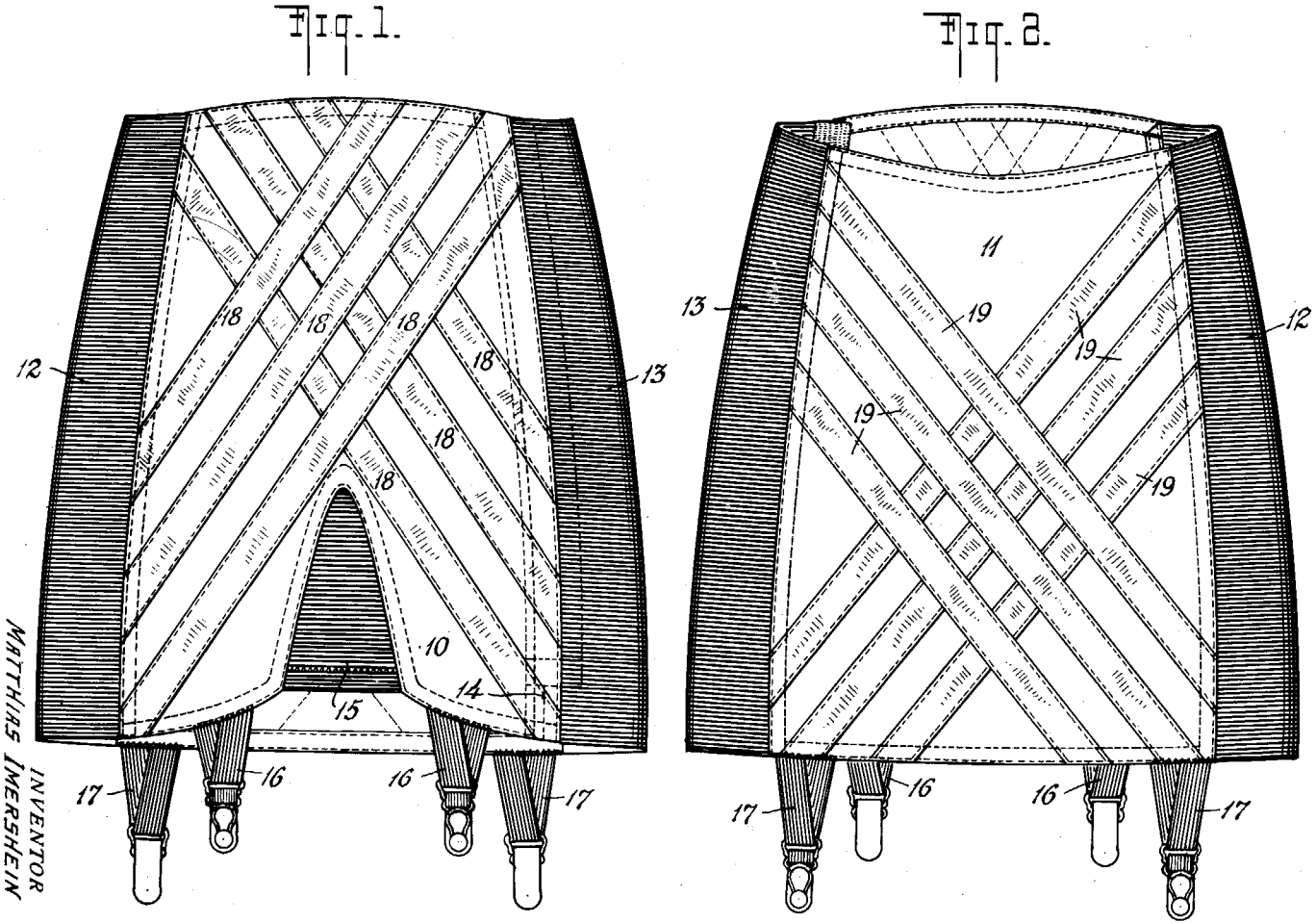
INVENTOR
MATTHIAS IMERSHEIN
BY
Howard E. Archenbach
ATTORNEY Oct. 8, 1940. M. IMERSHEIN Re. 21,595

UNDERGARMENT

Original Filed April 28, 1937 3 Sheets-Sheet 2

INVENTOR
MATTHIAS IMERSHEIN
BY
William E. Rockenbach
ATTORNEY

Oct. 8, 1940. M. IMERSHEIN Re. 21,595

UNDERGARMENT

Original Filed April 28, 1937 3 Sheets-Sheet 3

INVENTOR
MATTHIAS IMERSHEIN

BY

Williams E. Lackenbach
ATTORNEY

Reissued Oct. 8, 1940

Re. 21,595

UNITED STATES PATENT OFFICE 21,595

UNDERGARMENT

Matthias Imershein, New York, N. Y., assignor to Graceform-Camlin Corset Co., Inc., New York, N. Y., a corporation of New York Original No. 2,137,163, dated November 15, 1938, Serial No. 139,403, April 28, 1937. Application for reissue August 3, 1940, Serial No. 351,073

12 Claims. (Cl. 2—36)

Figure 4:
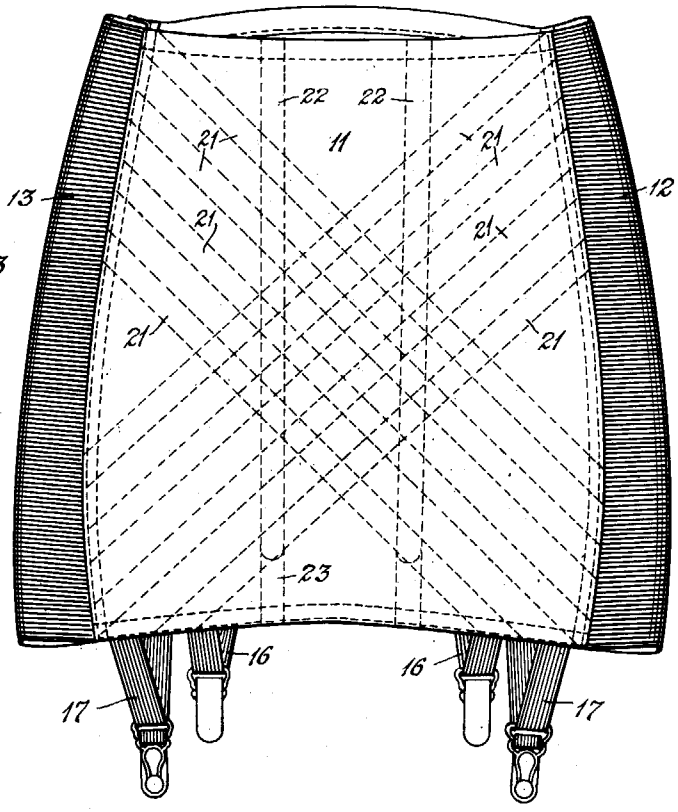

The invention relates to articles of apparel constituting ladies' undergarments, such as a girdle, foundation garment, or combination garment of which one portion is constituted of a girdle, such, for instance, as are known as "Corselettes." The invention, more particularly, consists in providing an undergarment of any usual type having a portion adapted to encircle the torso in the abdominal region thereof, in which such body encircling, or girdling portion has applied thereto, either upon its outer surface, or its inner surface, a plurality of ribbons, tapes, strippings, or like instrumentalities, disposed in a pattern of crossing bands of such ribbons, tapes, etc., throughout particular portions of such garments.

An object of the present invention is to provide such a body-encircling undergarment, usually a girdle, with a series of a plurality of strips of ribbons, tapes, or strippings, one such series of strips crossing another, the plurality of strips of ribbon, tape, or strippings, in each series being disposed in parallel relationship to each other.

The objects attained by such provision and disposition of ribbons and/or tapes are to secure, when the garment is worn, a flattening or smoothing of the figure at the portions of the body underlying the garments at those localities, and to effect an even distribution, by the slight pressure exerted by the strips of ribbon or tape, of the flesh, so that, instead of a direct inward pressure being applied against the more fleshy portions of the body, a uniform and widely distributed even flattening of a comparatively large area of the hypogastric region, in one case, and of the region directly below the small of the back, in the other, is effected. An effective control, more in accordance with the ideal anatomical contour of these regions of the body is thus obtained, without interference with the necessary flexibility of the garment, both for comfort during wear and for ease and facility in donning or removing the same.

By my novel undergarment, there is thus produced an appreciable reduction in the waist line by the effective control and proper distribution of the flesh in the abdominal region, a smoothing and flattening of the anatomical portion below and at the rear of such region, so as to cover the natural bulging of the thighs and at the same time provide a section of unusual strength and support.

In its broadest aspect, my invention contemplates the crossing of two or more strips of material, rigid or stretchable, the crossing being such that the area in which such crossing occurs overlies the abdomen and diaphragm, giving both additional support and a flattening effect to such parts, in the front; and like members, similarly disposed, in the back to give additional support and a flattening effect in the buttock and thigh regions.

Specific embodiments of my invention are shown in the accompanying drawings, the invention being shown therein as applied to a ladies' undergarment of the "girdle" type, the showing being intended by way of illustration, rather than by way of limitation.

Figure 3:
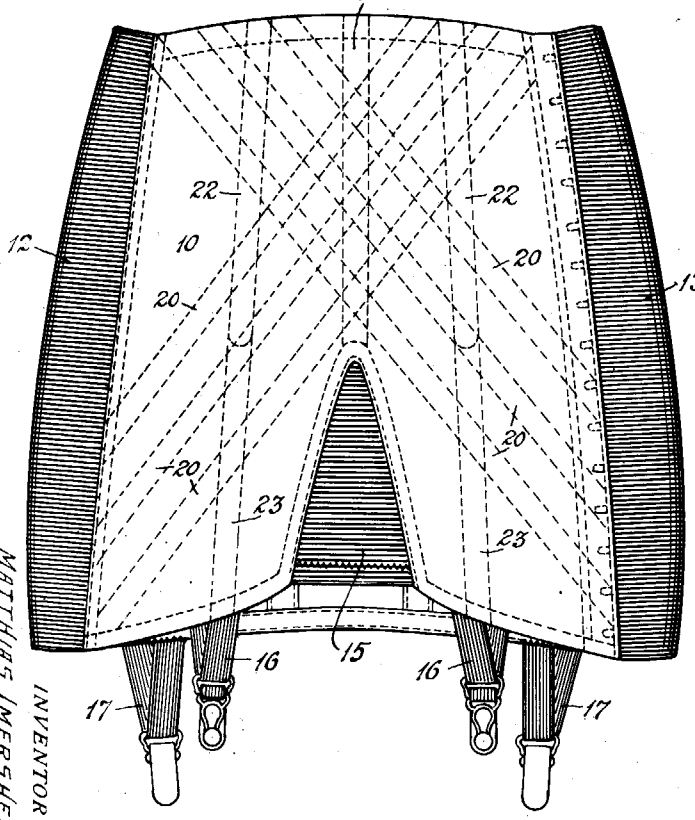
Figure 5:
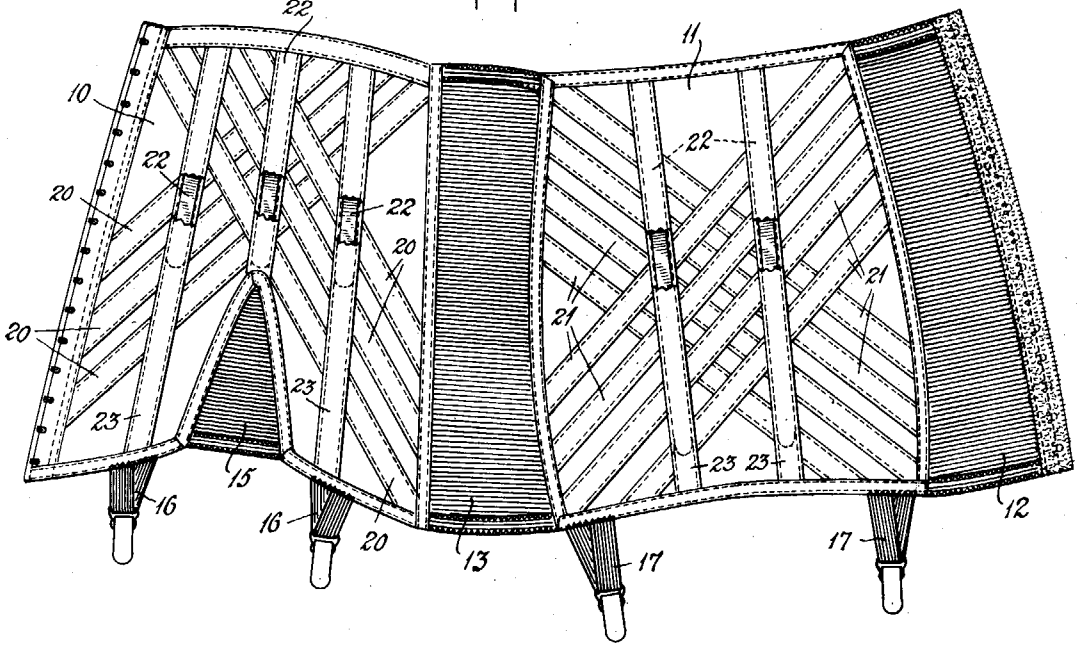

In such drawings, Fig. 1 is a front view of a girdle constructed in accordance with my invention; Fig. 2 is a rear view of such girdle; Fig. 3 is a front view of a second embodiment of the invention; Fig. 4 is a rear view thereof; and Fig. 5 is a view of the girdle of Fig. 3 and 4, showing the inner face of the girdle when it is in fully extended, flat condition.

Referring more particularly to the drawings, in which similar reference characters identify similar parts in the several views, the girdle of Figs. 1 and 2, in the construction of which my invention has been utilized, preferably consists of a front section 10 and a rear section 11, with two intermediate side sections 12 and 13, the sections being permanently joined at one side of the garment, while at the opposite side, the edges of the sections 11 and 13 are joined through only a small extent of their edges, as at 14, and are provided with cooperating fastener elements (not shown).

The front section 10 of the garment is constructed of any suitable material, for instance silk brocade, or of netting constituted of a plurality of plies, and may include devices, such as the elastic insert 15 assisting the girdle in its body conforming function. The body 10 may be also provided with hose supporters 16 of conventional form.

The rear section 11 of the girdle may be substantially of the form and material constituting the front section, but need not have an elastic insert. Conventional hose supporters 17 depend from the rear section of the girdle.

The two intermediate sections 12 and 13 are preferably constructed of an elastic material.

In this embodiment of my invention, illustrated in Figs. 1 and 2, I provide, upon the front section, sewn directly upon the outer surface thereof, two series of parallel strips of ribbon or tape 18, the strips of one series being disposed at angles of approximately 45 degrees running diagonally across the face of the section, and the strips of the other series being disposed at like angles, but running diagonally across the face of the section in the opposite direction, the two series of ribbons or tapes crossing in the upper half of the front section, or that portion of the girdle which is adapted, when the garment is worn, to overlie the hypogastric or abdominal region of the torso.

By this disposition of the strips of ribbon or tape, the portion of the torso, namely the abdomen or diaphragm region, requiring a flattening or smoothing of the flesh, is directly beneath the area of the section in which the ribbons or tapes cross.

In the rear section of the garment a like disposition of two series of ribbons 19 is made, but in such manner that the first series crosses the second series at a region of the garment which, when it is worn, overlies the buttocks or the portion of the torso below the small of the back, with the like result of flattening and smoothing the underlying flesh. The bottom portions of the ribbons or tapes effectively cover the bulges of the thighs.

It should be noted that one series of strips of ribbon or tape, i. e., those on the front section 10, extend from near the bottom extremities of the edges of the section, upwardly and diagonally, to substantially the upper edge of the section, whereas the other series of strips of ribbons or tape, i. e. those upon the rear section, extend from near the bottom extremities of the edges of the section to near the upper extremities of such edges, but not to the upper edge of the section. The area at which the series of strips cross each other, will therefore be higher in the first instance, namely upon the front section, than in the second, or on the rear section.

It will be understood that while I have shown the two series comprising three parallel strips of ribbon or tape, and any number, two or more, of such strips may be used in either series.

In the embodiment of my invention illustrated in Figs. 3 to 5, substantially the same effects and results are produced by series of tapes 20 on the front section and series of tapes 21 on the rear section. In such embodiment, however, the ribbons or tapes are secured by stitching, upon the inner faces of such sections, namely those which are adapted, when the garment is worn, to contact the body. In such second embodiment of my invention also, a great latitude in the number of tapes constituting either series, is possible, although I prefer to use such number as is illustrated.

In the garment illustrated in Figs. 3 to 5, both of the front and rear sections may be conveniently provided with boning 22, suitably disposed in pockets 23, there being shown three such bone inserts in the front section, extending approximately half way down the length of the section, and two such bone inserts in the rear section, extending substantially the entire length of the rear section. It is to be understood, of course, that my invention is not limited to undergarments, having such boning, but is equally applicable, with the same functions and results, to undergarments having no boning whatever therein.

While I have described particular embodiments of my invention, it is obvious that various modifications therein, particularly in the specific form and disposition of the parts may be made without departing from my invention.

It will be understood, for instance, that the advantages of my invention may be attained by any disposition of ribbons, tapes, or the like in which they cross in an area of the garment section which will give the benefit of the increased support and flattening effect, although not to the full extent resulting from the particular constructions described. Thus, it is conceivable, and I recognize such possibility, that similar advantages and effects will be produced by having the ribbons or tapes extend in horizontal and vertical directions, crossing each other at the regions described. Such structures, if embodying crossing ribbons or tapes, I regard within the ambit of my disclosure and invention.

In place of the ribbons or tapes, there may be used strippings, or ordinary binding cloth with its edges turned in. Such strips may be also constituted of plain ribbon or tape material or of stretchable material, such as lastex. Furthermore, such ribbons, tapes, or strippings may be sewn between two or more layers of material and so applied to the garment sections as to be concealed.

As already indicated, the basic principle of my novel undergarment, that is, the crossed disposition of the ribbons, tapes, or strippings, may be applied with equally good results to garments having any desirable type of boning wherever placed within, or upon the garment sections.

I claim:

1. A garment, including a tight fitting front portion, said portion having two series of parallel inelastic ribbons, tapes, or the like secured along their lengths to said portion, and extending substantially from one side to the other side of said portion, one series crossing the other diagonally in the region overlying the abdomen of the wearer.

2. A garment including a tight fitting rear portion, said portion having two series of parallel inelastic ribbons, tapes, or the like secured along their lengths to said portion, and extending substantially from one side to the other side of said portion, one series crossing the other in the region overlying the buttocks of the wearer.

3. An undergarment having a portion adapted to encircle the body of the wearer in the region of the abdomen, said portion having a front section provided with a plurality of strips of inelastic ribbon, tape, or the like secured thereto along their lengths, substantially in parallel relation, to constitute one series of such strips, and with another series of similar strips diagonally crossing said first series in the hypogastric region of the body, each of said series extending substantially from one side to the other side of said section, the area in which said series of strips cross overlying the abdomen when the garment is worn, said portion having a rear section which is similarly provided with two other series of strips of parallel ribbons, tape, or the like, crossing in the area of the garment overlying the buttocks and thighs when the garment is worn, each of said other series extending substantially from one side to the other side of said rear section, the major portion of the area in which the strips cross on the front section of the garment being higher than the major portion of the area in which the strips cross in the rear of the garment.

4. An undergarment as claimed in claim 3, said sections comprising substantially straight-sided panels, most of the strips on said front panel extending from the side edges of, and from near the bottom edge of said front panel to the top edge thereof, most of the strips on said rear panel extending from the side edges of, and from near the top edge of said rear panel to the bottom edge thereof.

5. An undergarment as claimed in claim 3, said portion having stretchable elastic side sections joining said front and rear sections.

6. A garment as claimed in claim 3, said garment having stretchable elastic side sections joining said front and rear sections, said side sections having substantially straight vertical edges, said front and rear sections being substantially rectilinear, most of the strips on said front section extending from the side edges of, and from near the bottom edge of said front section to the top edge thereof, most of the strips on said rear section extending from the side edges of, and from near the top edge of said rear section to the bottom edge thereof.

7. A garment, including a tight fitting front portion, said portion having two series of parallel ribbons, tapes, or the like secured along their lengths to said portion, and extending substantially from one side to the other side of said portion, one series crossing the other diagonally in the region overlying the abdomen of the wearer.

8. A garment including a tight fitting rear portion, said portion having two series of parallel ribbons, tapes, or the like secured along their lengths to said portion, and extending substantially from one side to the other side of said portion, one series crossing the other in the region overlying the buttocks of the wearer.

9. An undergarment having a portion adapted to encircle the body of the wearer in the region of the abdomen, said portion having a front section provided with a plurality of strips of ribbon, tape, or the like secured thereto along their lengths, substantially in parallel relation, to constitute one series of such strips, and with another series of similar strips diagonally crossing said first series in the hypogastric region of the body, each of said series extending substantially from one side to the other side of said section, the area in which said series of strips cross overlying the abdomen when the garment is worn, said portion having a rear section which is similarly provided with two other series of strips of parallel ribbons, tape, or the like, crossing in the area of the garment overlying the buttocks and thighs when the garment is worn, each of said other series extending substantially from one side to the other side of said rear section, the major portion of the area in which the strips cross on the front section of the garment being higher than the major portion of the area in which the strips cross in the rear of the garment.

10. An undergarment as claimed in claim 9, said sections comprising substantially straight-sided panels, most of the strips on said front panel extending from the side edges of, and from near the bottom edge of said front panel to the top edge thereof, most of the strips on said rear panel extending from the side edges of, and from near the top edge of said rear panel to the bottom edge thereof.

11. An undergarment as claimed in claim 9, said portion having stretchable elastic side sections joining said front and rear sections.

12. A garment as claimed in claim 9, said garment having stretchable elastic side sections joining said front and rear sections, said side sections having substantially straight vertical edges, said front and rear sections being substantially rectilinear, most of the strips on said front section extending from the side edges of, and from near the bottom edge of said front section to the top edge thereof, most of the strips on said rear section extending from the side edges of, and from near the top edge of said rear section to the bottom edge thereof.

MATTHIAS IMERSHEIN.